Patented Apr. 22, 1952

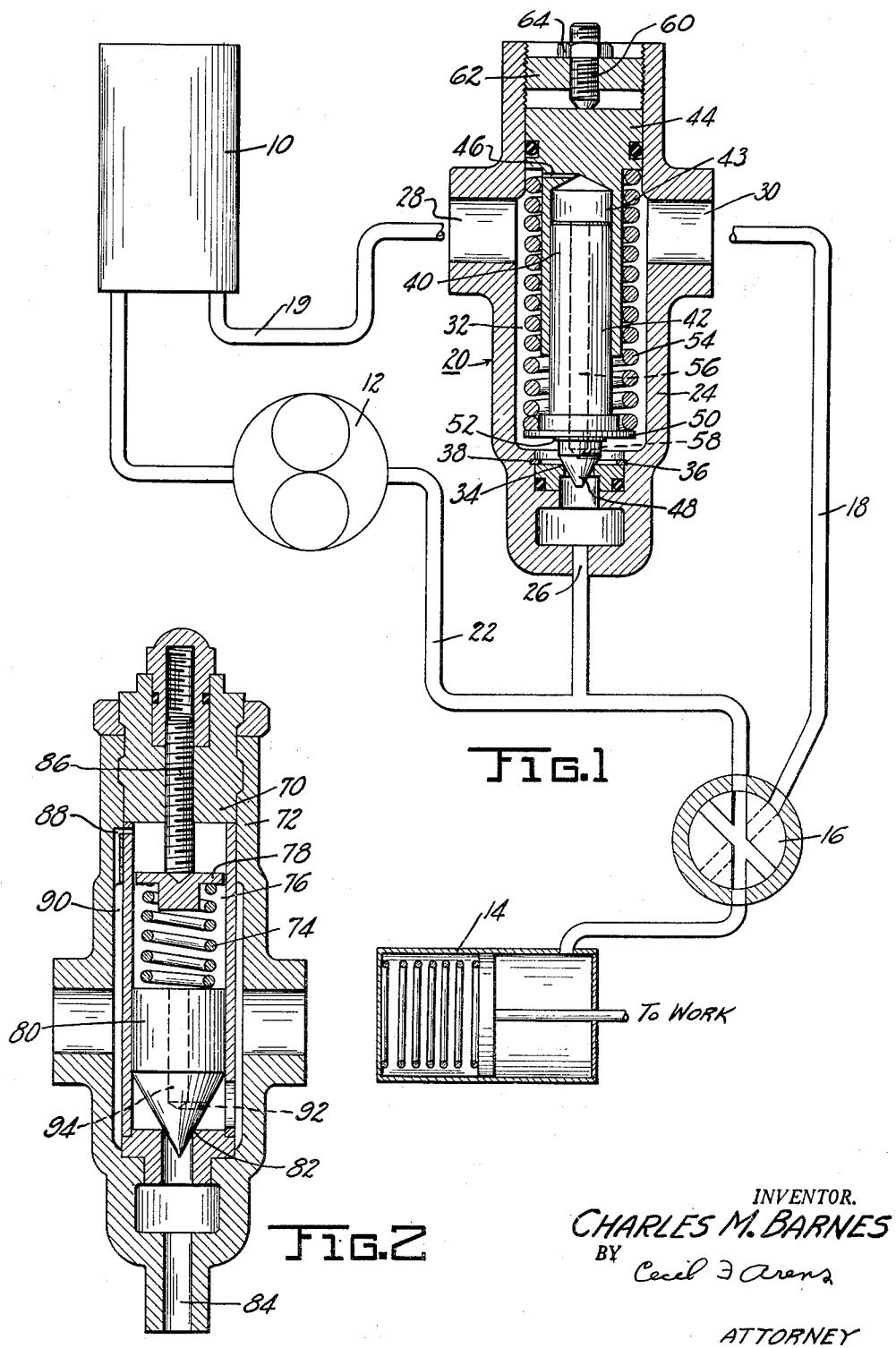

2,593,522

UNITED STATES PATENT OFFICE 2,593,522

VALVE

Charles M. Barnes, South Bend, Ind., assignor to Bendix Aviation Corporation, South Bend, Ind., a corporation of Delaware Application April 23, 1949, Serial No. 89,271

3 Claims. (Cl. 137—53)

This invention relates to valves for use in hydraulic systems and more particularly to relief valves for use in such a system.

It is a well known fact that entrapped air in a liquid system produces an undesirable condition which frequently results not only in the inefficient operation of many of the appurtenances of the system but even renders some of the devices totally inoperable. For example, in the case of a hydraulically damped relief valve, any air which may become entrapped in the liquid chamber of the valve would tend to upset the normal operation of the entire system since the preselected action of the valve is destroyed. The valve action might be caused to vary considerably depending on the amount of entrained air.

It is, therefore, an important object of the invention to construct a damped relief valve which entraps a minimum of air in its liquid chamber.

A further object of the invention resides in the provision of a relief valve so constructed and arranged in a hydraulic system as to actually cause the release of entrapped air to the system each time the valve is actuated.

Another object of the invention is to provide a relief valve simple in construction and operation, and efficient in performance.

The above and other objects and features of the invention will be apparent from the following description of the apparatus taken in connection with the accompanying drawing which forms a part of this specification, and in which:

Figure 1 represents a hydraulic system in which the device of the invention is incorporated; and Figure 2 is a modified form of the device shown in Figure 1.

Referring now to Figure 1 of the drawing the reference numeral 10 designates a fluid reservoir to which is connected a pump 12 for putting fluid under pressure in a single acting fluid motor 14. A manually controlled valve 16 is interposed between the pump 12 and fluid motor 14 for controlling the flow of fluid under pressure to said motor. A pipe 18 connects the valve 16 to the reservoir 10 to thereby provide a return line for the pump discharge when the valve 16 is rotated to the dotted line position. In the full line position the valve 16 connects the discharge side of the pump to the motor. To relieve the pressure which builds up beyond a predetermined value in the motor 14, when the manually operated valve is connected as shown in the full line position, a relief valve 20 is interposed between the motor and the reservoir. A conduit 22 connects the discharge side of the pump to the inlet end of the relief valve which is located in the pipe lines 18 and 19 so as to permit the free flow of fluid therethrough when the valve 16 is in the dotted line position.

The relief valve 20, which is normally closed to prevent by-passing fluid therethrough to the reservoir 10 via conduits 19 and 22, comprises a body member 24 having an inlet and an outlet 26 and 28 respectively. An opening 30 in the body member is interiorly threaded to receive one end of the conduit 18, the other end of which is connected to the manually operated valve 16. The outlet 28 is connected to one end of the pipe line 19, the other end of which is joined to the reservoir 10. Obviously the only reason for connecting the pipe line 18 to the relief valve is to utilize the return line 19. Otherwise pipe line 18 would be connected to the reservoir 10, thus duplicating the existing line 19.

The body member 24 of the relief valve is formed with a chamber 32 therein, with which the inlet 26, outlet 28, and opening 30 communicate. A valve seat 34 is interposed between the inlet 26 and the chamber 32 and is secured in place by a retainer ring 36 which engages a groove 38 of the body member. A dash pot 40 is arranged in the chamber 32 opposite said valve seat and includes a valve member 42 slidably fitted into the open end of bore 43 of the dash pot housing 44. The closed end of the bore 43 is provided with a restricted passage 46. One end of the valve member extends beyond the end of the bore 43 and is formed with a valve head 48 thereon for engagement with the valve seat 34. The valve member is reduced in diameter adjacent the valve head to receive a collar 50 held in position by a retainer ring 52. A coiled spring 54 is interposed between the dash pot housing and the collar 50 to thereby urge the valve member in a direction to seat the valve head on the seat 34. The valve member 42 is furnished with a longitudinal bore 56 and a restricted passage 58, the latter of which is drilled radially in the valve member and is of the same diameter as the restricted passage 46. The restrictions 46 and 58 are arranged in the dash pot so that when the valve is mounted for operation one restriction will always be at a higher elevation than the other to thereby insure the escape of air from within the dash pot.

In order to adjust the valve for actuation at a predetermined inlet pressure the dash pot housing 44 is made slidable within the chamber 32 to thereby vary the preload on the spring 54. The spring 54 urges the dash pot housing against an adjusting pin 60 threadedly carried by a plug 62 removably mounted in one end of the chamber to provide a closure therefor. The adjusting pin 60 is equipped with a locknut 64 for retaining the pin 60 in any desired position.

The effectiveness of a relief valve of this type and construction depends upon the ability of the device to damp the valve member movement when unseated. Obviously the valve action is not going to be the same with air entrapped in the bore 43 as with solid liquid therein. The two restrictions 46 and 58 provide an exit for air which may otherwise become entrapped in the bore 43 or passage 56. It will be noted that an escape for air is provided irrespective of the position of the valve. That is, not only can the entrapped air escape from either end of the dash pot due to the inherent tendency of air to rise to the top of a fluid but this action is supplemented by the pumping action of the valve member in the dashpot when said valve member is unseated. It also seems only logical that with openings, that is, restrictions 46 and 58, at each end of the bore 43 there will be circulation therethrough which will carry any entrapped air into the chamber 32.

With the valve 16 in the full line position, of Figure 1, the pressure in the conduit 22 must reach a predetermined value, depending upon the setting of the adjusting pin 60, before the valve member 42 will be unseated to thereby by-pass fluid to the reservoir, via the chamber 32 and the return line 19.

With the valve 16 in the dotted line position of Figure 1 the pump 12 merely circulates the liquid continuously around the hydraulic circuit.

Figure 2 is a modified form of the invention in which dash pot body 70 is fixed with respect to a valve body member 72, and spring 74 is located inside of a bore 76 of the body. The spring is interposed between a spring retainer washer 78 and a valve member 80 slidably positioned within the bore 76 so that one end of the member bears against a valve seat 82 in much the same manner as in the preferred embodiment of Figure 1 to normally cut off flow through inlet 84. The spring retainer washer 78 is urged against an adjusting pin 86 threadedly carried by the dash pot body 70 so that the relief valve can be adjusted to any desired pressure setting. A restricted passage 88 communicates the upper end of bore 76 with a chamber 90 located in the valve body member 72. The end of the valve member adjacent the valve seat 82 is provided with a restricted radial passage 92 which communicates the bore 76 with the chamber 90 via a longitudinal or axial passage 94 in the valve member. We thus have the two restrictions 88 and 92 located at opposite ends of bore 76 and each communicating said bore with the chamber 90. The principle of operation of the modified form of valve is identical with the preferred embodiment.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A valve for controlling the flow of liquid comprising a body having an opening thereinto, a valve seat in said opening, a valve member normally seated on said seat and unseated in response to a predetermined liquid pressure in said opening, means associated with said valve member for damping the movement thereof and including a dashpot adapted to contain a liquid, said dashpot having two telescoping relatively movable members, one of which carries said valve member, the other of which is adjustable axially relative to said valve seat, means interposed between said other telescoping member and said valve member so that adjustment axially of the former controls the predetermined liquid pressure in said opening for unseating the latter, restricted passages communicating the interior of said dashpot with the exterior thereof to thereby permit flow therethrough, and means for adjusting the position of said other member axially relative to said valve seat.

2. A valve comprising a body with a chamber having an opening thereinto, means for controlling the flow of liquid through said opening and including a dashpot in said chamber, said dashpot having two telescoping relatively movable members, one of which is constructed and arranged to open and close said opening, the other of which is adjustably carried by said body, a spring interposed between said two relatively movable members urging said one member in a direction tending to close said opening, and a restricted passage in each of said relatively movable members connecting the interior of said dashpot to said chamber.

3. A valve comprising a body with a chamber having an opening thereinto, an outlet communicating with said chamber, means for controlling the flow of liquid through said opening and including a dashpot located in the chamber, said dashpot having a member slidably located in one end thereof and constructed and arranged to open and close said opening, an adjustable member located at the other end of said dashpot, a spring interposed between said adjustable member and said first named member urging the latter member in a direction tending to close said opening, a first restricted passage in said first named member connecting one end of the interior of said dashpot with said chamber, and a second restricted passage located in said other end of said dashpot and connecting the interior thereof with said chamber, said restricted passages being so disposed within said dashpot that movement of said first named member in one direction establishes flow in said passages in a direction tending to expel entrapped air from said dashpot.

CHARLES M. BARNES.

REFERENCES CITED

The following references are of record in the file of this patent:

UNITED STATES PATENTS

| Number | Name | Date |
| --- | --- | --- |
| 515,578 | Eynon | Feb. 27, 1894 |
| 935,709 | Turner | Oct. 5, 1904 |
| 982,680 | Iverson | Jan. 24, 1911 |
| 1,754,975 | Anderson | Apr. 15, 1930 |
| 2,165,611 | Campbell | July 11, 1939 |
| 2,311,292 | Eilers | Feb. 16, 1943 |